United States Patent
Li et al.

(10) Patent No.: US 12,468,924 B2
(45) Date of Patent: Nov. 11, 2025

(54) PARALLEL COMPUTING SCHEME GENERATION FOR NEURAL NETWORKS

(71) Applicant: HUAWEI TECHNOLOGIES CO., LTD., Shenzhen (CN)

(72) Inventors: Chong Li, Boulogne Billancourt (FR); Thibaut Tachon, Boulogne Billancourt (FR); Hongxing Wang, Shenzhen (CN); Kelun Chai, Boulogne Billancourt (FR); Chang Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 637 days.

(21) Appl. No.: 17/953,991

(22) Filed: Sep. 27, 2022

(65) Prior Publication Data

US 2023/0024350 A1    Jan. 26, 2023

Related U.S. Application Data

(63) Continuation of application No. PCT/EP2020/058707, filed on Mar. 27, 2020.

(51) Int. Cl.
*G06N 3/06* (2006.01)
(52) U.S. Cl.
CPC ........................... *G06N 3/06* (2013.01)
(58) Field of Classification Search
None
See application file for complete search history.

(56) References Cited

U.S. PATENT DOCUMENTS

| 4,890,242 A | 12/1989 | Sinha et al. |
| 10,223,644 B2 * | 3/2019 | Gadde .................... G06N 20/00 |

(Continued)

FOREIGN PATENT DOCUMENTS

| CN | 107168683 A | 9/2017 |
| CN | 110263923 A | 9/2019 |

(Continued)

OTHER PUBLICATIONS

Khorasani et al, "In-Register Parameter Caching for Dynamic Neural Nets with Virtual Persistent Processor Specialization", Oct. 1, 2018, IEEE, 2018 51st Annual IEEE/ACM International Symposium on Microarchitecture (Micro) (2018, pp. 377-389) (Year: 2018).*

(Continued)

*Primary Examiner* — Kambiz Zand
(74) *Attorney, Agent, or Firm* — Leydig, Voit & Mayer, Ltd.

(57) ABSTRACT

A device receives a computation graph and transforms the computation graph into a dataflow graph comprising recursive subgraphs. Each recursive subgraph comprises a tuple of another recursive subgraph and an operator node, or an empty graph. The device determines a number of partitioning recursions based on a number of parallel computing devices. For each partitioning recursion, the device determines costs corresponding to operator nodes, determines a processing order of the recursive subgraphs, and processes the recursive subgraphs. To process a recursive subgraph, the device selects a partitioning axis for tensors associated with an operator node of the recursive subgraph. The device outputs a partitioning scheme comprising partitioning axes for each tensor associated with the operator nodes.

15 Claims, 9 Drawing Sheets

(56) References Cited

U.S. PATENT DOCUMENTS

| | | | |
|---|---|---|---|
| 2012/0078436 A1* | 3/2012 | Patel | G06N 3/08 |
| | | | 700/298 |
| 2016/0124730 A1 | 5/2016 | Boehm et al. | |
| 2018/0189638 A1* | 7/2018 | Nurvitadhi | G06N 3/063 |
| 2018/0260219 A1 | 9/2018 | Przybylski | |
| 2020/0042660 A1 | 2/2020 | Teng | |
| 2020/0074296 A1* | 3/2020 | Singh | G06N 3/044 |
| 2020/0387799 A1* | 12/2020 | Vivekraja | G06N 3/044 |

FOREIGN PATENT DOCUMENTS

| | | |
|---|---|---|
| GB | 2455077 A | 6/2009 |
| WO | 2017037659 A1 | 3/2017 |

OTHER PUBLICATIONS

Laich "Graph Partitioning and Scheduling for Distributed Dataflow Computation," Institute of Parallel and Distributed Systems, University of Stuttgart UniversitatsstraBe 38 D-70569 Stuttgart, Total 71 pages, XP055465499, Retrieved from the Internet: URL: https://elib.uni-stuttgart.de/bitstream/11682/9279/1/Graph%20Partitioning%20and%20Scheduling%20for%20Distributed%20Dataflow%20Computation.pdf (Commenced: Sep. 14, 2016, Completed: Mar. 16, 2017).

Jia et al., "Exploring Hidden Dimensions in Parallelizing Convolutional Neural Networks," arXiv:1802.04924v2 [cs.LG], Total 11 pages (Jun. 9, 2018).

Jia et al., "Beyond Data and Model Parallelism for Deep Neural Networks," arXiv:1807.05358v1 [cs.DC], Total 15 pages (Jul. 14, 2018).

Wang et al., "Supporting Very Large Models using Automatic Dataflow Graph Partitioning," arXiv:1807.08887v2 [cs.DC], Total 18 pages (Feb. 20, 2019).

\* cited by examiner (a)

(b)

(c)

PARALLEL COMPUTING SCHEME GENERATION FOR NEURAL NETWORKS

CROSS-REFERENCE TO RELATED APPLICATIONS

This application is a continuation of International Application No. PCT/EP2020/058707, filed on Mar. 27, 2020, the disclosure of which is hereby incorporated by reference in its entirety.

FIELD

The present disclosure generally relates to the field of neural networks and distributed parallel computing technologies. In particular, some embodiments of the disclosure relate to generating a parallel computing scheme for a neural network.

BACKGROUND

Neural networks or other machine learning tools enable automation of tasks for various types of applications. Example applications include analysis and processing of text data, speech data, image data, video data, or the like. However, even though neural networks provide a powerful tool for automating tasks, processing of complex neural networks may be slow or even not feasible in all devices.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure provides an efficient and deterministic parallel computation scheme generation method for neural networks. Further implementation forms are apparent from the description, and the drawings.

According to a first aspect, a device for determining a parallel computation scheme for a neural network is provided. The device may be configured to receive a computation graph for the neural network and transform the computation graph into a dataflow graph comprising a plurality of recursive subgraphs. Each recursive subgraph may comprise a tuple of another recursive subgraph and an operator node or an empty graph. The device may be configured to determine a number of partitioning recursions based on a number of parallel computing devices. The device may be configured to, for each partitioning recursion, determine a plurality of costs corresponding to a plurality of operator nodes associated with the dataflow graph, determine a processing order of the plurality of recursive subgraphs based on a descending order of the plurality of costs, and process the plurality of recursive subgraphs in the determined processing order. Processing a recursive subgraph may comprise selecting a partitioning axis for tensors associated with an operator node of the recursive subgraph. The device may be configured to output a partitioning scheme comprising partitioning axes for each tensor associated with the plurality of operator nodes. This solution provides an efficient and deterministic manner for determining a parallel computation scheme for a neural network.

According to an implementation form of the first aspect, the device may be further configured to determine the number of partitioning recursions such that $2^N$ is equal to the number of parallel computing devices, wherein N is the number of partitioning recursions. This solution enables to determine a preconfigured number of partitioning recursions.

According to an implementation form of the first aspect, the device may be further configured to determine the plurality of costs corresponding to the plurality of operator nodes based on an amount of data to be communicated between the parallel computing devices for each operator node. This solution enables to prioritize high-cost operator nodes when determining the partitioning scheme.

According to an implementation form of the first aspect, the device may be further configured to select the partitioning axis for the tensors associated with the operator node based on an intra-operator communication cost comprising an amount of data to be communicated between the parallel computing devices for the operator node. This solution enables to reduce communication between the parallel computing devices.

According to an implementation form of the first aspect, the device may be further configured to select the partitioning axis for the tensors associated with the operator node based on the intra-operator communication cost, if no partitioning axis has been determined for a neighboring operator node at a current partitioning recursion. This solution enables to approximate the communication cost for the operator node.

According to an implementation form of the first aspect, the device may be further configured to select the partitioning axis for the tensors associated with the operator node based on an inter-operator communication cost comprising an amount of data to be communicated between the parallel computing devices for executing a neighboring operator node based on a shared tensor between the operator node and the neighboring operator node or for executing the operator node based on an output of the neighboring operator node. This solution enables to reduce communication between parallel computing devices due to dependencies between operator nodes.

According to an implementation form of the first aspect, the device may be further configured to select the partitioning axis for the tensors associated with the operator node based on the intra-operator communication cost and the inter-operator communication cost, if at least one partitioning axis has been determined for the neighboring operator node or another neighboring operator node at a current partitioning recursion. This solution enables to reduce communication between parallel computing devices due to intra-operator and inter-operator communication.

According to an implementation form of the first aspect, the device may be further configured to determine whether the partitioning scheme complies with at least one memory requirement associated with the parallel computing devices. The device may be further configured to output the partitioning scheme in response to determining that the partitioning scheme complies with the at least one memory requirement associated with the parallel computing devices. This solution enables to verify the determined parallel computing scheme with respect to capabilities of the parallel computing devices.

According to a second aspect, a method for determining a parallel computation scheme for a neural network is provided. The method may comprise receiving a computation graph for the neural network and transforming the computation graph into a dataflow graph comprising a plurality of recursive subgraphs. Each recursive subgraph may comprise a tuple of another recursive subgraph and an operator node or an empty graph. The method may comprise determining a number of partitioning recursions based on a number of parallel computing devices. The method may comprise, for each partitioning recursion: determining a plurality of costs corresponding to a plurality of operator nodes associated with the dataflow graph, determining a processing order of the plurality of recursive subgraphs based on a descending order of the plurality of costs, and processing the plurality of recursive subgraphs in the determined processing order. Processing a recursive subgraph may comprise selecting a partitioning axis for tensors associated with an operator node of the recursive subgraph. The method may comprise outputting a partitioning scheme comprising partitioning axes for each tensor associated with the plurality of operator nodes. This solution provides an efficient and deterministic manner for determining a parallel computation scheme for a neural network.

According to an implementation form of the second aspect, the method may further comprise determining the number of partitioning recursions such that $2^N$ is equal to the number of parallel computing devices, wherein N is the number of partitioning recursions. This solution enables to determine a preconfigured number of partitioning recursions.

According to an implementation form of the second aspect, the method may further comprise determining the plurality of costs corresponding to the plurality of operator nodes based on an amount of data to be communicated between the parallel computing devices for each operator node. This solution enables to prioritize high-cost operator nodes when determining the partitioning scheme.

According to an implementation form of the second aspect, the method may further comprise selecting the partitioning axis for the tensors associated with the operator node based on an intra-operator communication cost comprising an amount of data to be communicated between the parallel computing devices for the operator node. This solution enables to reduce communication between the parallel computing devices.

According to an implementation form of the second aspect, the method may further comprise selecting the partitioning axis for the tensors associated with the operator node based on the intra-operator communication cost, if no partitioning axis has been determined for a neighboring operator node at a current partitioning recursion. This solution enables to approximate the communication cost for the operator node.

According to an implementation form of the second aspect, the method may further comprise selecting the partitioning axis for the tensors associated with the operator node based on an inter-operator communication cost comprising an amount of data to be communicated between the parallel computing devices for executing a neighboring operator node based on a shared tensor between the operator node and the neighboring operator node or for executing the operator node based on an output of the neighboring operator node. This solution enables to reduce communication between parallel computing devices due to dependencies between operator nodes.

According to an implementation form of the second aspect, the method may further comprise selecting the partitioning axis for the tensors associated with the operator node based on the intra-operator communication cost and the inter-operator communication cost, if at least one partitioning axis has been determined for the neighboring operator node or another neighboring operator node at a current partitioning recursion. This solution enables to reduce communication between parallel computing devices due to intra-operator and inter-operator communication.

According to an implementation form of the second aspect, the method may further comprise determining whether the partitioning scheme complies with at least one memory requirement associated with the parallel computing devices. The method may further comprise outputting the partitioning scheme in response to determining that the partitioning scheme complies with the at least one memory requirement associated with the parallel computing devices. This solution enables to verify the determined parallel computing scheme with respect to capabilities of the parallel computing devices.

According to a third aspect, a computer program is provided. The computer program may comprise program code configured to cause performance of the method of any implementation form of the second aspect, when the computer program is executed on a computer.

According to a fourth aspect, a computer program product comprising a computer readable storage medium storing program code is provided. The program code may comprise instructions for performing any implementation form of the second aspect.

Implementation forms of the present disclosure can thus provide a device, a method, a computer program, and a computer program product for determining a parallel computation scheme for a neural network. These and other aspects of the present disclosure will be apparent from the example embodiment(s) described below.

DESCRIPTION OF THE DRAWINGS

The accompanying drawings, which are included to provide a further understanding of the example embodiments and constitute a part of this specification, illustrate example embodiments and, together with the description, help to explain the example embodiments. In the drawings.

Like references are used to designate like parts in the accompanying drawings.

DETAILED DESCRIPTION

References will now be made in detail to exemplary embodiments, which are illustrated in the accompanying drawings. The detailed description provided below in connection with the appended drawings is intended as a description of the present embodiments and is not intended to represent the only forms in which the present examples may be constructed or utilized. The description sets forth the functions of the examples and the sequence of steps for constructing and operating the examples. However, the same or equivalent functions and sequences may be accomplished by different examples.

A neural network may comprise a set of interconnected neurons that may be collectively trained for performing a specific task. A layer of the neural network may comprise a plurality of neurons configured to provide an output based on input received from one or more other layers. Each neuron, or node, may be therefore configured to perform an elementary computation. In general, a neuron may be connected to one or more other neurons and the connection(s) may be associated with a weight. The weights may be used to adjust impact of each neuron to the output of the neural network. For example, weights may be adjusted to train the neural network to provide a desired output for a set of training data. A layer of the neural network may be represented as a tensor. A tensor may comprise a multidimensional array comprising scalar values that represent parameters, for example, weights of the layer. For example, a convolutional layer may be represented as a tensor comprising weights for a plurality of filters. Furthermore, inputs and outputs of the layers may be represented as tensors.

According to an embodiment, a device may determine a parallel computation scheme for a neural network. The device may receive a computation graph. The device may transform the computation graph into a dataflow graph comprising recursive subgraphs. Each recursive subgraph may comprise a tuple of another recursive subgraph and an operator node, or an empty graph. The device may determine a number of partitioning recursions based on a number of parallel computing devices. For each partitioning recursion, the device may determine costs corresponding to operator nodes, determine a processing order of the recursive subgraphs, and process the recursive subgraphs. To process a recursive subgraph, the device may select a partitioning axis for tensor(s) associated with an operator node of the recursive subgraph. The device may output a partitioning scheme comprising partitioning axes for each tensor associated with the operator nodes. Therefore, an efficient and deterministic manner for determining a parallel computation scheme for a neural network is disclosed. The parallel computation scheme may be applied, for example, when training the neural network.

Figure 1:
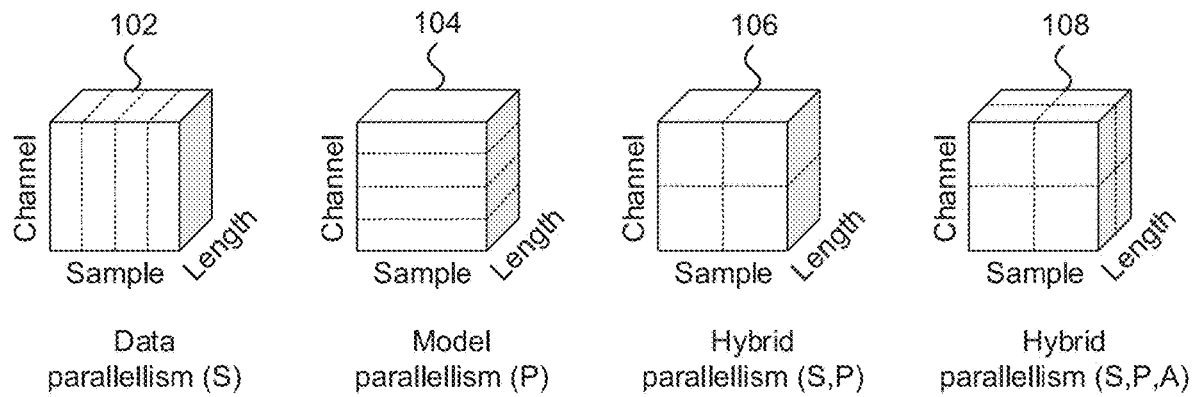
FIG. 1 illustrates an example of parallel computation of a neural network with respect to different tensor dimensions, according to an embodiment of the present disclosure.

FIG. 1 illustrates an example of parallel computation of a neural network with respect to different tensor dimensions, according to an embodiment. In data parallelism, the tensor 102 may be divided into multiple subtensors with respect to different samples (S) and the subtensors may be processed by different computing devices such as, for example, CPUs (central processing unit), GPUs (graphic processing unit), or processor cores of a processing unit. In model parallelism, tensor 104 may be divided into subtensors with respect to parameters (P), for example, channels. In a first example of hybrid parallelism, tensor 106 may be divided into subtensors with respect to both samples (S) and parameters (P), for example, the channels. In a second example of hybrid parallelism, tensor 108 may be divided into subtensors with respect to samples (S), parameters (P) such as, for example, channels, and attributes (A) such as, for example, length.

Different types of neural network layers may be associated with different parallelizable dimensions. For example, a one-dimensional (1D) pooling layer may be parallelized with respect to samples or attributes such as length or channel. A 1D convolutional layer may be parallelized with respect to samples or attributes, for example, length. A two-dimensional (2D) convolutional layer may be parallelized with respect to samples, attributes such as length and width, or parameters such as channel. A matrix multiplication may be parallelized with respect to samples or parameters, for example, channels.

A parallel efficiency may be measured based on $$E_p = \frac{S_p}{p} = \frac{T_1}{pT_p},$$

where $$S_p = \frac{T_1}{T_p}$$

is an acceleration ratio, p indicates the number of processors, $T_1$ indicates the execution time of a corresponding sequential algorithm, and $T_p$ indicates the execution time of the parallel algorithm with p processors. Value of the parallel efficiency $E_p$ may be generally between 0 and 1, and it indicates to which degree a processor participating in the computation is used compared with costs of communication and synchronization during problem solving. A higher value indicates better utilization.

Figure 2:
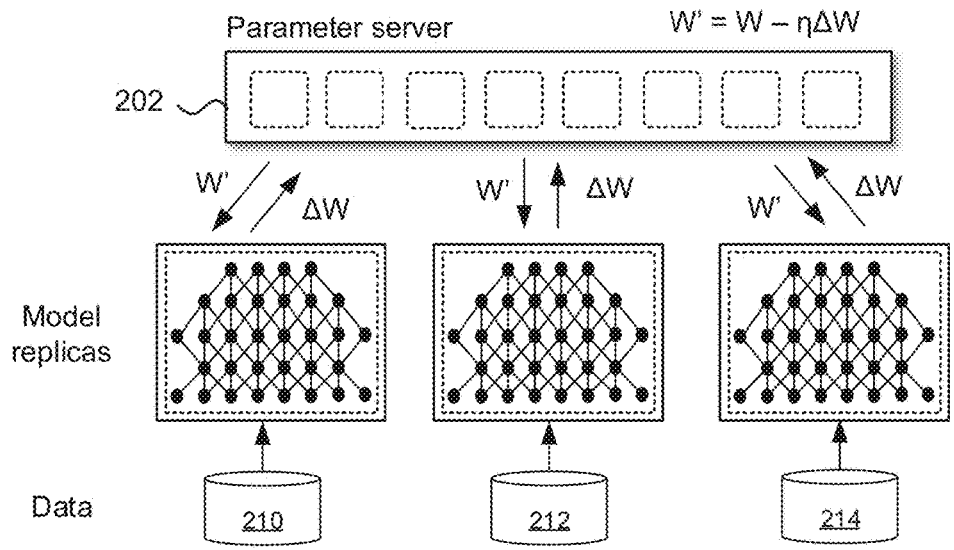
FIG. 2 illustrates an example of data parallelism, according to an embodiment of the present disclosure.

FIG. 2 illustrates an example of data parallelism, according to an embodiment. In data parallelism, computing devices may process different groups of samples 210, 212, 214, for example, training data. Each computing device may use a complete neural network (model) computation graph. For example, only the batch size (also referred to as a sample) of the neural network may be grouped. More computing devices may be used to improve the computing capability and thereby to reduce the training time. Each computing device may communicate with a parameter server 202 to receive weights W' and to compute a weight update $\Delta W$ based on the training data available to each computing device. Each computing device may provide their weight updates $\Delta W$ to the parameter server 202, which may combine the weight updates received from the computing devices and determine a resultant weight update for the neural network, for example, by $W'=W-\eta\Delta W$, which may be then communicated to the computing devices for determining further weight updates.

Figure 3:
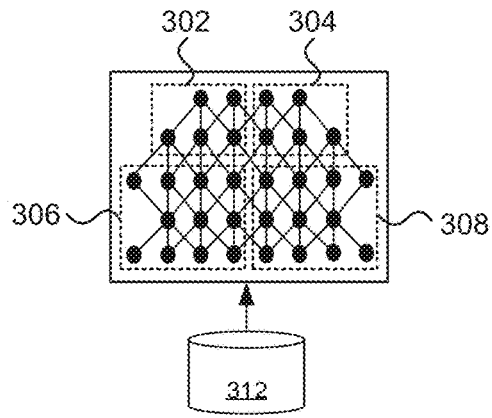
FIG. 3 illustrates an example of model parallelism, according to an embodiment of the present disclosure.

FIG. 3 illustrates an example of model parallelism, according to an embodiment. In model parallelism multiple computing devices may work together to process data in the same group of data 312. A neural network computation graph may be divided into multiple subgraphs 302, 304, 306, 308. Each computing device may process one of the subgraphs. The method may include performing pipelined partitioning on a computation graph, and performing mathematical partitioning on a channel of a neural network, or other tensor dimensions such as, for example, height or width. Model parallelism not only improves the computing power, but it may also solve the problem of not being able to store an entire neural network in a single computing device.

In hybrid parallelism, data parallelism and model parallelism may be used together to improve the parallel efficiency. However, due to the large number of partitioning possibilities, the optimization complexity of the hybrid parallelism strategy may be high. Example embodiments described herein provide an efficient solution for obtaining a hybrid parallel computation scheme for neural networks, or any other suitable types of machine learning models.

Figure 4:
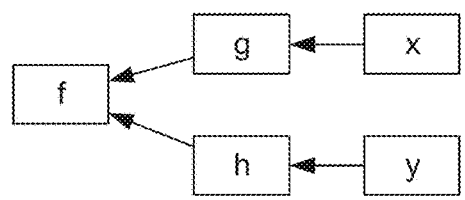
FIG. 4 illustrates an example of an A-normal form computation graph, according to an embodiment of the present disclosure.

FIG. 4 illustrates an example of an A-normal form computation graph, according to an embodiment. An A-normal form (ANF) computation graph is a type of computation graph where arguments of functions are trivial, e.g. may be evaluated instantly. An ANF graph represents dependencies (edges) between function and argument (nodes). FIG. 4 illustrates an ANF representation of expression f(g(x), h(y)). Computation of a neural network may be defined by an ANF graph, which may define operations with corresponding inputs and/or output to calculate a neural network.

Figure 5:
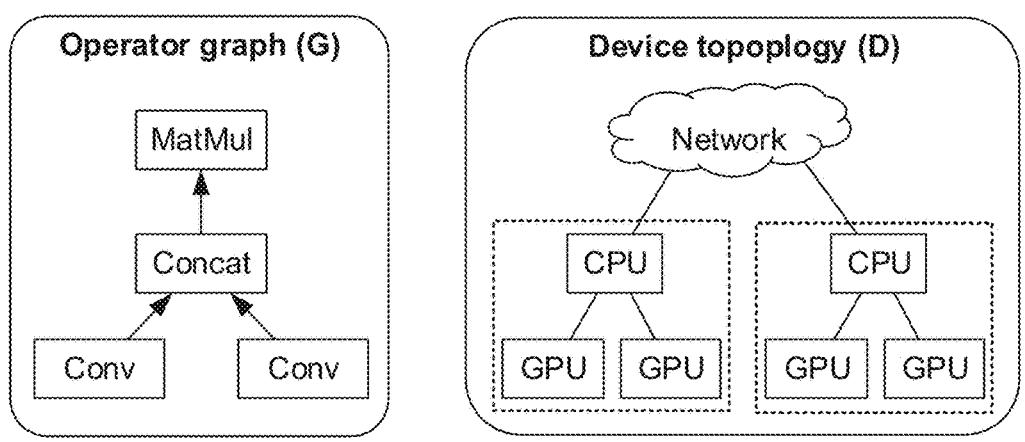
FIG. 5 illustrates an example of a computation graph for a neural network and a device topology graph, according to an embodiment of the present disclosure.

FIG. 5 illustrates an example of a computation graph (G) for a neural network and a device topology graph (D), according to an embodiment. The computation graph may be also called an operator graph and it may comprise multiple operator nodes, or computation nodes. For example, a concatenation operation (Concat) may be performed based on outputs of two convolution operations (Conv). Furthermore, a matrix multiplication operation (MatMul) may be performed on the output of the concatenation. FIG. 5 also illustrates a distributed parallel device topology. For example, each of two CPUs may be connected to two GPUs. The CPUs may be further connected over a network. A distributed parallel scheme may comprise a mapping from each operator node of G to a configuration C, where each configuration C describes a parallel implementation of an operator node of G over the multiple devices of the topology D.

Figure 6:
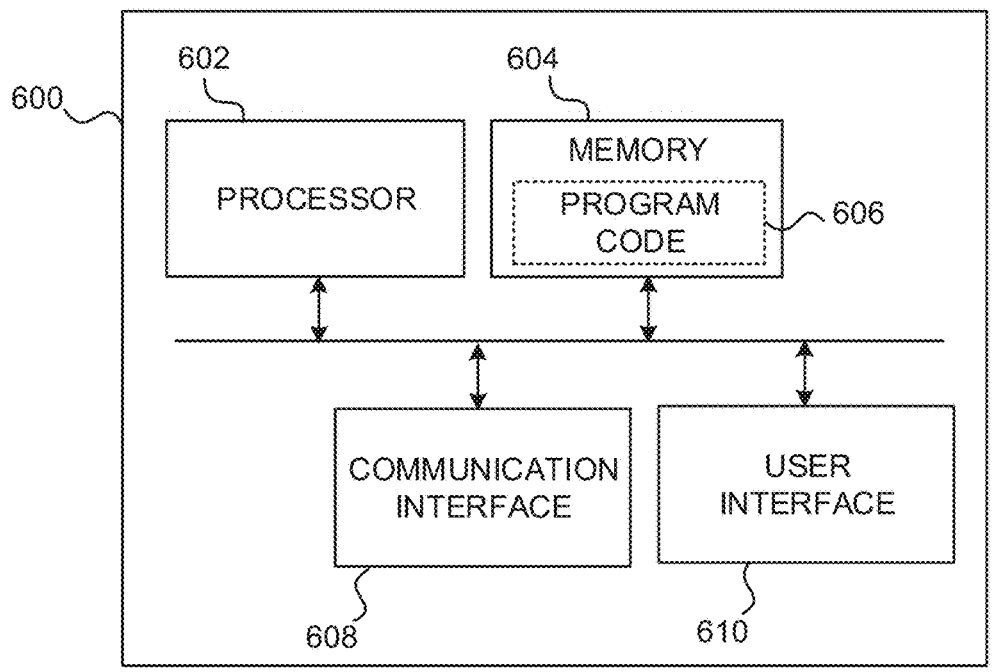
FIG. 6 illustrates an example of a device configured to practice one or more embodiments of the present disclosure.

FIG. 6 illustrates an example of a device configured to practice one or more embodiments. Device 600 may be, for example, configured to determine a parallel computing scheme for a neural network. Device 600 may comprise at least one processor 602. The at least one processor may comprise, for example, one or more of various processing devices, such as, for example, a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The device may further comprise at least one memory 604. The memory may be configured to store, for example, computer program code or the like, for example, operating system software and application software. The memory 604 may be also configured to store neural network(s), or portion(s) thereof. For example, the memory 604 may be configured to store a topology (e.g. computation graph) and types of operations and/or shapes of tensors associated with the topology. As described for model parallelism, one entire neural network (with attribute values) may be too large to be stored in a memory of a single device. A neural network, or portion(s) thereof, may be therefore stored in the memory 604 or received over the communication interface 608 from an external source. The memory may comprise one or more volatile memory devices, one or more non-volatile memory devices, and/or a combination thereof. For example, the memory may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

Device 600 may further comprise communication interface 608 configured to enable the device 600 to transmit and/or receive information. The communication interface may be configured to provide at least one wireless radio connection, such as, for example, a 3GPP mobile broadband connection (e.g. 3G, 4G, 5G); a wireless local area network (WLAN) connection such as, for example, standardized by IEEE 802.11 series or Wi-Fi alliance; a short range wireless network connection such as, for example, a Bluetooth, NFC (near-field communication), or RFID connection; a local wired connection such as, for example, a local area network (LAN) connection or a universal serial bus (USB) connection, or the like; or a wired Internet connection. A wired connection may comprise an internal data interface, for example, a system bus, PCI-E (peripheral component interconnect express), or any other suitable interconnection for a hardware.

Device 600 may further comprise a user interface 610 comprising at least one input device and/or at least one output device. The input device may take various forms such a keyboard, a touch screen, or one or more embedded control buttons. The output device may, for example, comprise a display, a speaker, a vibration motor, or the like.

When the device 600 is configured to implement some functionality, some component and/or components of the device, such as, for example, the at least one processor and/or the memory, may be configured to implement this functionality. Furthermore, when the at least one processor 602 is configured to implement some functionality, this functionality may be implemented using program code 606 comprised, for example, in the memory 604.

The functionality described herein may be performed, at least in part, by one or more computer program product components such as software components. According to an embodiment, the device comprises a processor or processor circuitry, such as, for example, a microcontroller, configured by the program code when executed to execute the embodiments of the operations and functionality described herein. Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), graphics processing units (GPUs), or the like.

Device 600 may be configured to perform method(s) described herein or comprise means for performing method(s) described herein. In one example, the means comprises the at least one processor 602, the at least one memory 604 including program code 606 configured to, when executed by the at least one processor 602, cause the device 600 to perform the method(s).

Device 600 may comprise, for example, a computing device such as, for example, a server, a desktop, a laptop, a tablet computer, a mobile phone, or the like. Although device 600 is illustrated as a single device, it is appreciated that, wherever applicable, functions of device 600 may be distributed to a plurality of devices, for example, to implement example embodiments as a cloud computing service.

Figure 7:
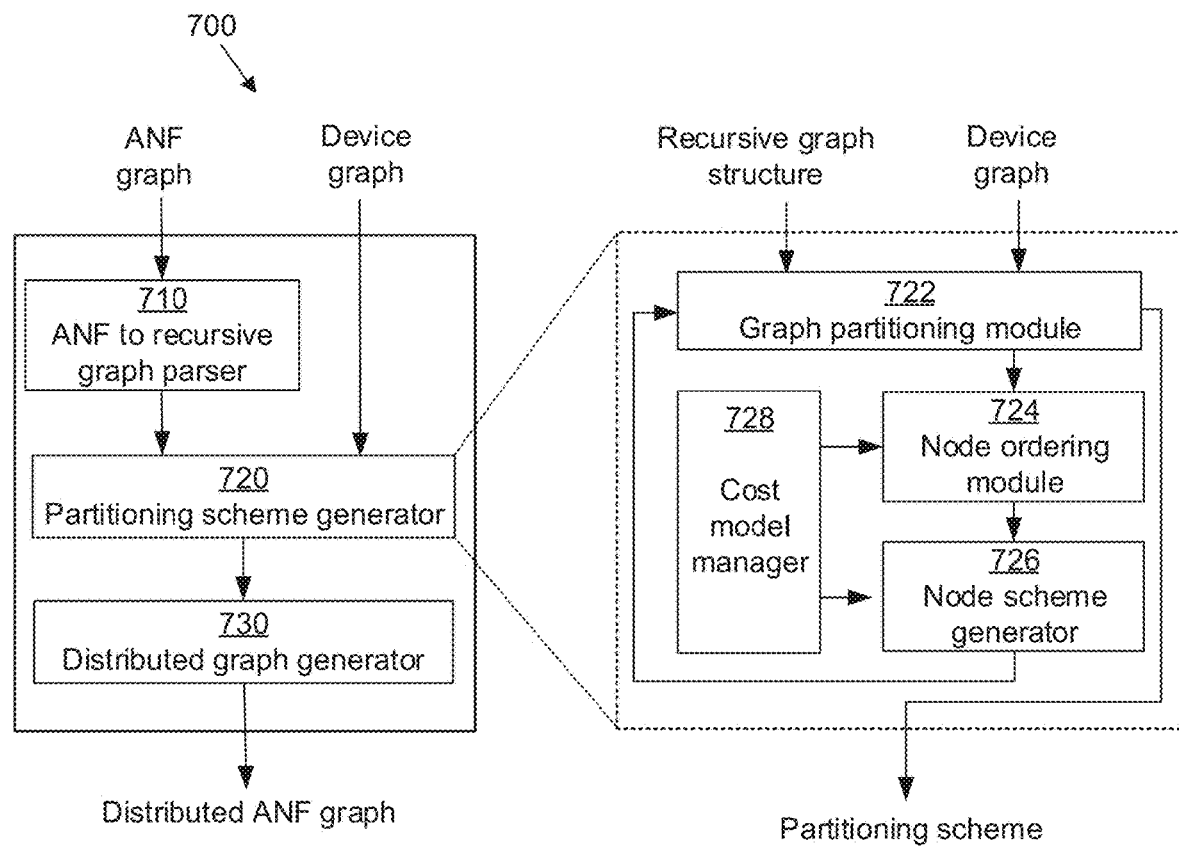
FIG. 7 illustrates an example of a system architecture for determining a parallel computing scheme, according to an embodiment of the present disclosure.

FIG. 7 illustrates an example of a system architecture for determining a parallel computing scheme, according to an embodiment. The system 700 may receive as an input a computation graph for a neural network. The computation graph may, for example, comprise an ANF graph. Even though example embodiments have been described using ANF graph as an example, it is appreciated the example embodiments may be applied to any suitable computation graphs. The ANF graph may be received, for example, from a neural network parser. The neural network parser may be located at the same device with the system 700, or the ANF graph may be received from an external neural network parser, for example, over communication interface 608. An output of the system 700 may comprise a distributed parallel computation scheme for the input computation graph. The output may be provided as in input to a distributed execution code generator, for example, over an internal or external communication interface. The various functions, blocks, or modules of the system architecture 700 may be implemented as software and/or hardware component(s), for example, at device 600.

An ANF to recursive graph parser 710 may be configured to receive the ANF graph and transform the ANF graph into a recursive structure computation graph, for example, a dataflow graph comprising a plurality of recursive subgraphs. A recursive graph may comprise a subgraph and an operator node. Each recursive subgraph can be a recursive graph, or an empty graph.

Figure 8:
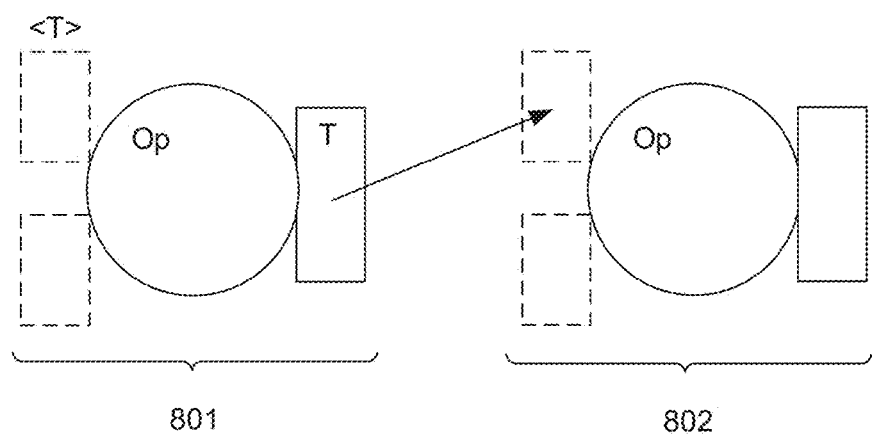
FIG. 8 illustrates an example of a recursive computation graph, according to an embodiment of the present disclosure.

FIG. 8 illustrates an example of a recursive computation graph, according to an embodiment. A graph may comprise an operator node 801 and a subgraph 802. Alternatively, the graph could be considered to comprise an operator node 802 with a subgraph 801. Considering 801 as an operator node and 802 as its subgraph, the subgraph 802 may comprise a subgraph, which is an empty graph in this example, and its operator node (itself). For example, considering an example graph A-B-C with three operator nodes (A, B, C), a recursive graph may comprise an operator node A and a subgraph B-C. The subgraph B-C may comprise an operator node B and a subgraph C. The subgraph C may comprise an operator node C and an empty graph. This order may be described by (A(B(C( )))). The graph may be reordered into (((A( )B)C), (A(B( )C)), or any other order.

Figure 9:
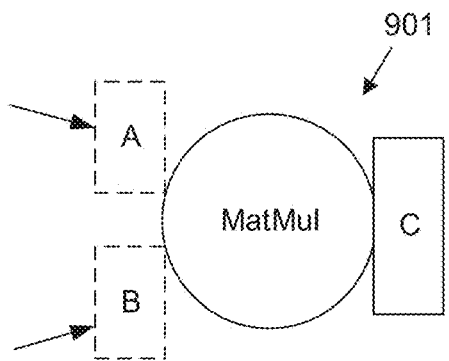
FIG. 9 illustrates an example of transforming a computation graph into a dataflow graph comprising a recursive subgraph, according to an embodiment of the present disclosure.
Figure 9:
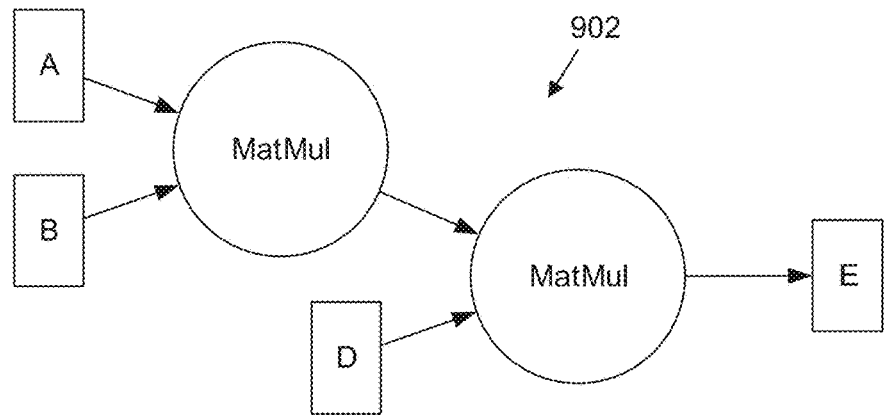
Figure 9:
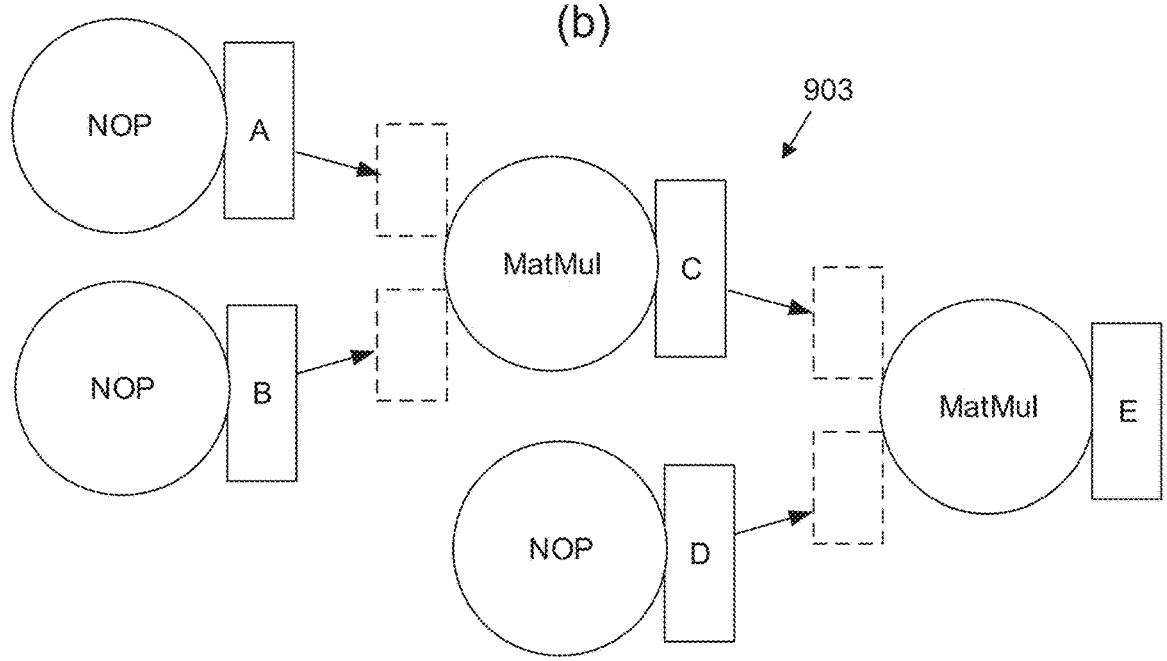

FIG. 9 illustrates an example of transforming a computation graph into a dataflow graph comprising recursive subgraphs, according to an embodiment. An operator node may be characterized by a type of the operator node, the shape of its output tensor, and/or a list of input tensors and/or their incoming edges. The first graph (a) illustrates an example of a matrix multiplication operator node 901 with output tensor C and input tensors A and B. The second graph (b) illustrates an example of an ANF 902 of E=MatMul (MatMul(A,B)D). Alternatively, the ANF graph may be described as E=(A×B)×D. The third graph (c) illustrates an example of a recursive graph 903 determined based on the computation dataflow graph 902. The recursive graph 903 comprises a first matrix multiplication operator node (MatMul-E) and a first subgraph. The first subgraph comprises a NOP-D (input D with no operation) and a second subgraph. The second subgraph comprises a second matrix multiplication operator node (MatMul-C) a third subgraph. The third subgraph comprises NOP-A and a fourth subgraph. The fourth subgraph comprises NOP-A and a fifth subgraph, which is an empty graph. Therefore, a computation graph such as, for example, an ANF graph may be transformed into a dataflow graph comprising recursive subgraphs, which may be used to efficiently determine a parallel computing scheme.

Referring back to FIG. 7, the system 700 may further comprise a partitioning scheme generator 720, which may control a number of external recursions based on a number of parallel computing devices. The partitioning scheme generator 720 may further call a graph partitioning module 722 to perform an internal recursion. The partitioning scheme generator 720 may receive intermediate strategies obtained by the graph partitioning module 722 and combine the intermediate strategies into a final scheme. The partitioning scheme generator 720 may further check whether the final scheme is feasible based on characteristics of the parallel computing, for example, memory information and/or a memory performance model(s) of the parallel computing devices. Finally, the partitioning scheme generator 720 may output the final scheme, for example, to a distributed graph generator 730.

The cost model manager 728 may store and manage one or more symbolic performance cost models, for example, a communication cost mode and a memory cost model. Both the communication cost model and the memory cost model may be algebraic symbolic models, which can be combined with each other for computation, instead of execution to get hardware measurement information. The cost model manager 728 may determine costs for particular tensor operations, for example, based on dimensions of tensors associated with an operator node and a type of the operator node.

The memory cost model may comprise a number of tensor elements stored inside a partition. The memory cost model may be used as a termination criterion or as an additional termination criterion for determining whether to perform a further partitioning recursion, as will be further described in relation to FIG. 10. An example of a communication cost model is described in relation to FIGS. 11 to 14.

The graph partitioning module 722 may call a node ordering module 724 to reorganize the recursive sequence of the graph nodes for processing. The graph partitioning module 722 may further receive a partitioning axis (split axis) selected by a node scheme generator 726 for each node. The graph partitioning module 722 may combine the selected partitioning axes of operator nodes of the recursive graph into an intermediate scheme. The intermediate scheme may be sent to the partitioning scheme generator 720.

The node ordering module 724 may call the cost model manager 728, for example, a communication cost model within the cost model manager 728, to rearrange the operator nodes of the recursive graph structure. For example, the operator node with the highest potential internal communication cost may be placed before other operator nodes in a processing order. The graph partitioning module 722 may be called in the order of the rearranged sequence of operator nodes.

The node scheme generator 726 may call the cost model manager 728, for example, the communication cost model within the cost model manager 728, to select the partitioning axis for the current operator node. The partitioning axis may be selected for each node of the recursive graph, to provide an intermediate partitioning scheme for the partitioning scheme generator 720.

Figure 10:
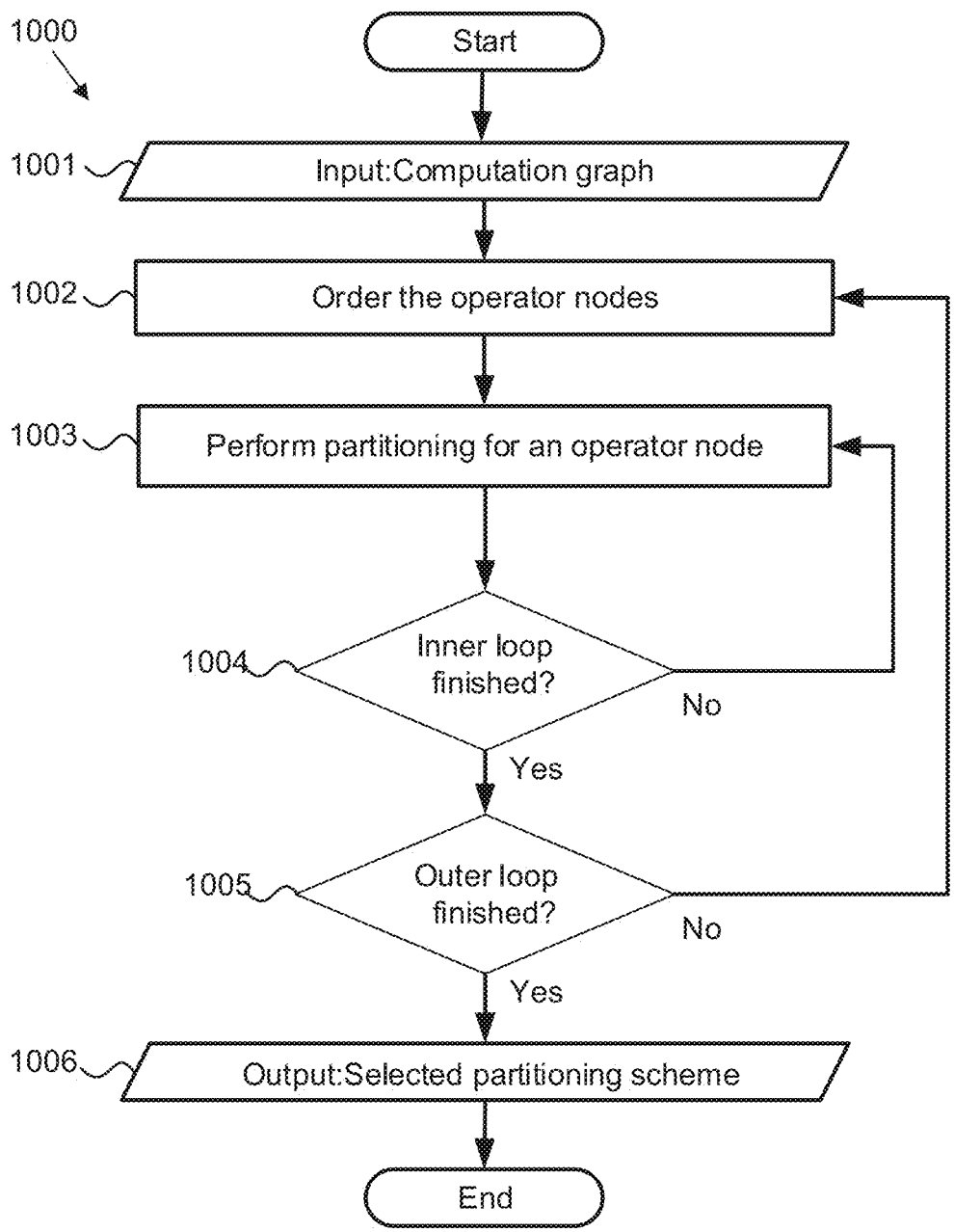
FIG. 10 illustrates an example of a method for determining a parallel computation scheme for a neural network, according to an embodiment of the present disclosure.

FIG. 10 illustrates an example of a method for determining a parallel computation scheme for a neural network, according to an embodiment.

At 1001, a device, for example, device 600, may receive a computation graph for a neural network. The computation graph may be of any suitable form. The device may transform the computation graph into a dataflow graph comprising a plurality of recursive subgraphs. However, according to an embodiment the input graph may comprise a recursive graph and therefore no transformation of the input computation graph may be needed. A recursive subgraph may comprise a tuple of another subgraph and an operator node. Alternatively, a subgraph can be an empty graph.

The device may further determine a number of partitioning recursions based on a number of parallel computing devices. At each partitioning recursion, tensors associated with operator nodes may be partitioned into two subtensors. For example, at a first partitioning recursion a tensor may be partitioned into two subtensors. At a second partitioning recursion, each of the two subtensors may be further partitioned into two subtensors, etc. The partitioning recursions may be iterated until the number of subtensors recursively determined for each original tensor is equal to the number of parallel computing devices. For example, the device may determine the number of partitioning recursions such that $2^N$ is equal to the number of parallel computing devices, where N is the number of partitioning recursions.

At 1002, the device may order the operator nodes. The device may, for example, determine a processing order of the plurality of recursive subgraphs. The device may determine a plurality of costs corresponding to a plurality of operator nodes associated with the dataflow graph and determine the processing order of the plurality of recursive subgraphs based on a descending order of the plurality of costs. The plurality of costs corresponding to the plurality of operator nodes may be determined based on an amount of data to be communicated between the parallel computing devices for each operator node. The amount of data may be determined based on an upper limit of the data to be communicated for executing an operator node. Alternatively, the amount of data may be determined based on a lower limit of the data to be communicated for executing the operator node. The different amounts of data required to be communicated may correspond to different partitioning axes. For example, a recursive subgraph comprising an operator node with the highest potential intra-operator communication cost may be selected as a first recursive subgraph to be processed. Processing a recursive subgraph may comprise processing an operator node of the recursive subgraph. The subgraphs may be processed in a descending order of the intra-operator communication cost. For example, the node ordering module 724 may retrieve the plurality of costs associated with the operator node of each subgraph from the cost model manager 728. The node ordering module 724 may determine the processing order based on the retrieved information. Furthermore, the node ordering module 724 may provide an indication of the processing order to the node scheme generator 726 and/or the graph partitioning module 722.

At 1003, the device may perform partitioning for an operator node. The device may process the plurality of recursive subgraphs in the processing order determined at 1002. Processing of a recursive subgraph may comprise selecting a partitioning axis for tensor(s) associated with an operator node of the recursive subgraph. The partitioning axis may be determined, for example, for one or more input tensors and/or an output tensor. For example, the device may begin with the first recursive subgraph in the processing order determined at 1002. The device may select a partitioning axis for at least one input and/or output tensor associated with the operator node of the first recursive subgraph.

According to an embodiment, the device may select the partitioning axis for the tensors associated with the operator node based on an intra-operator communication cost. The intra-operator communication cost may comprise an amount of data to be communicated between the parallel computing devices for the operator node. The amount of data may be, for example, measured in as a number of tensor elements that need to be exchanged between the parallel computing devices to execute the operator node. For example, the multiple parallel computing devices may need particular portions of the input tensors to perform part of the operation. Multiple computing devices may need the same data and therefore data may need to be communicated between the parallel computing devices, which may result in a high communication cost. Determining the partitioning axis based on the intra-operator communication cost enables to reduce the communication overhead caused by the parallel processing.

According to an example embodiment, the device may select the partitioning axis for the tensors associated with the operator node based on the intra-operator communication cost, if no partitioning axis has been determined for a neighboring operator node at a current partitioning recursion. This enables to approximate a cost for an operator node even if a partitioning scheme has not been fixed for neighboring node(s). For example, if no partitioning axis has been determined for neighboring operator node(s), it may not be possible to estimate cost of interactions between the nodes. Therefore, in this case the partitioning axis may be selected based on the intra-operator communication cost. For example, the device may select a partitioning axis associated with the lowest intra-operator communication cost.

According to an example embodiment, the device may select the partitioning axis for the tensors associated with the operator node based on an inter-operator communication cost comprising an amount of data to be communicated between the parallel computing devices for executing a neighboring operator node based on a shared tensor between the operator node and the neighboring operator node or for executing the operator node based on an output of the neighboring operator node. The amount of data may be, for example, measured as a number of tensor elements that need to be exchanged between the parallel computing devices to execute the neighboring operator node or the operator node. This enables to take into account interactions between operator nodes when determining the partitioning axis. For example, a tensor may be shared with a neighboring operator node and the shared tensor, or portion(s) thereof, may need to be communicated between different computing devices to execute the neighboring operator node or the operator node. Alternatively, or additionally, an output of an operator node, or portion(s) thereof, may need to be communicated between different computing devices. Considering this inter-operator communication cost enables to select the partitioning axes such that overhead caused by additional communication between the parallel computing devices due to interactions between operator nodes is reduced. For example, the device may select a partitioning axis associated with the lowest inter-operator communication cost.

According to an example embodiment, a device may select the partitioning axis for the tensors associated with the operator node based on the intra-operator communication cost and the inter-operator communication cost, if at least one partitioning axis has been determined for the neighboring operator node or another neighboring operator node at the current partitioning recursion. Both the intra-operator communication cost and the inter-operator communication cost may be considered, for example, if a partitioning axis has been determined for one of a plurality of neighboring operator nodes. For example, the device may select a partitioning axis based on a sum, or other combination, of the intra-operator communication cost and the inter-operator communication cost. For example, a partitioning axis associated with the lowest value of the sum may be selected.

At 1004, the device may determine whether the inner loop of the method 1000 is finished. For example, the device may determine whether all of the plurality of recursive subgraphs of the dataflow graph have been processed. If there are further subgraphs to be processed, the device may return to 1003 and process the next subgraph in the processing order. For example, a partitioning axis may be determined for the next recursive subgraph. The selected partitioning axis may be different from partitioning axes selected for previously processed recursive subgraphs. If the plurality of recursive subgraphs has been already processed, the device may determine an intermediate parallelization scheme, which may comprise the partitioning axes selected for the plurality of recursive subgraphs.

At 1005, the device may determine whether the outer loop is finished. For example, the device may determine whether the determined number of partitioning recursions has been completed. If there are further partitioning recursions to be performed, the device may return to 1002 to order the operator nodes. The device may therefore determine again a processing order for the recursive subgraphs. The processing order may differ from the processing order determined for a previous partitioning recursion. Alternatively, the device may return to 1003, if the recursive subgraphs are configured to be processed in the same order as for the previous partitioning recursion.

In addition, or as an alternative, to the determined number of partitioning recursions, the memory cost model may be used to determine whether the outer loop is finished. For example, if all tensor partitions are determined to fit in a number of parallel computing devices associated with the current partitioning recursion, the device may terminate the partitioning. Therefore, according to an example embodiment, the device may determine a number of partitioning recursions based on the memory cost model.

At 1003, the device may process the recursive subgraphs in the processing order until each of the plurality of recursive subgraphs has been processed. At each iteration of the inner loop, the device may select a partitioning axis for the (sub)tensors of an operator node resulting from the previous iteration of the outer loop. Hence, the each tensor may be eventually partitioned into a plurality of subtensors, wherein the number of the plurality of subtensors corresponds to the number of parallel computing devices. In general, the inner loop of method 1000 may determine partitioning axes for tensors of the recursive subgraphs and the outer loop causes further partitioning of the tensors based on the number of parallel computing devices.

At 1004, the device may determine whether the inner loop is finished and move to 1003 to perform partitioning for a next operator node or to 1005, if there are no further operator nodes to be processed for this partitioning recursion.

At 1005, the device may determine whether the outer loop is finished. For example, the device may determine whether the determined number of partitioning recursions has been completed. If there are no further partitioning recursions to be the device may move to 1006.

At 1006, the device may output the selected partitioning scheme. The partitioning scheme may comprise partitioning axes for each tensor associated with the plurality of operator nodes. The partitioning scheme may, for example, comprise an indication of a partitioning axis for each tensor. The partitioning scheme may further comprise indications of partitioning axes for (sub)tensors resulting from partitioning the tensors according to their corresponding partitioning axes.

According to an example embodiment, the device may determine whether the partitioning scheme complies with at least one memory requirement associated with the parallel computing devices. Furthermore, the device may output the partitioning scheme in response to determining that the partitioning scheme complies with the at least one memory requirement associated with the parallel computing devices. For example, the device may determine whether the parallel computing devices have sufficient memory and/or processing resources for storing and/or processing the (sub)tensors and operations assigned to each computing device. According to an example embodiment, the device may output the partitioning scheme in response to determining that the partitioning scheme complies with all memory requirements associated with the parallel computing devices.

Even though method 1000 has been described to be performed by a device, it is appreciated that the method may be performed by any suitable entity such as, for example, a system comprising one or more software and/or hardware components or a plurality of distributed computing devices.

Figure 11:
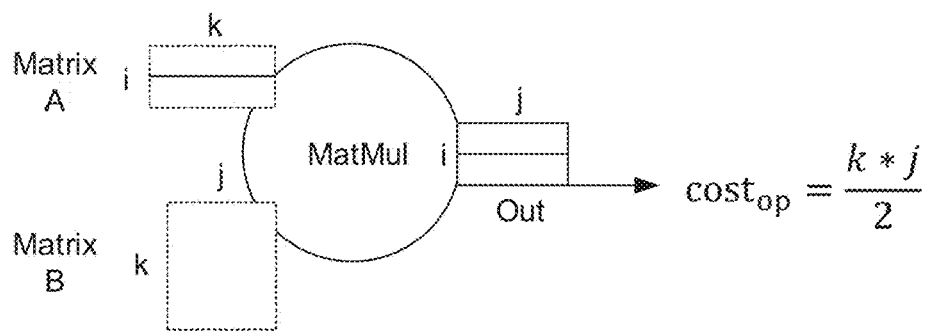
FIG. 11 illustrates an example of a partitioning configuration for matrix multiplication, according to an embodiment of the present disclosure.

FIG. 11 illustrates an example of a partitioning configuration for matrix multiplication, according to an embodiment. Matrices A and B are provided as examples of input tensors. In a first partitioning configuration, matrix A may be partitioned with respect to axis i. For example, an upper half of matrix A may be considered as a first subtensor and a lower half of matrix A may be considered as a second subtensor. The computation of the matrix multiplication may be distributed between a first computing device and a second computing device. To calculate the partitioned matrix multiplication the first computing device may need to have access to the upper half of matrix A having dimensions i,k, and entire matrix B having dimensions k,j. The second computing device may need to have access to the lower half of matrix A and entire matrix B. Therefore, an intra-operator communication cost for the first partitioning configuration may be determined based on dimensions of matrix B, for example, by $$\text{cost}_{op} = \frac{k * j}{2}.$$

The output tensor may comprise an upper subtensor comprising and output matrix of the first computing device and a lower subtensor comprising an output matrix of the second computing device.

Figure 12:
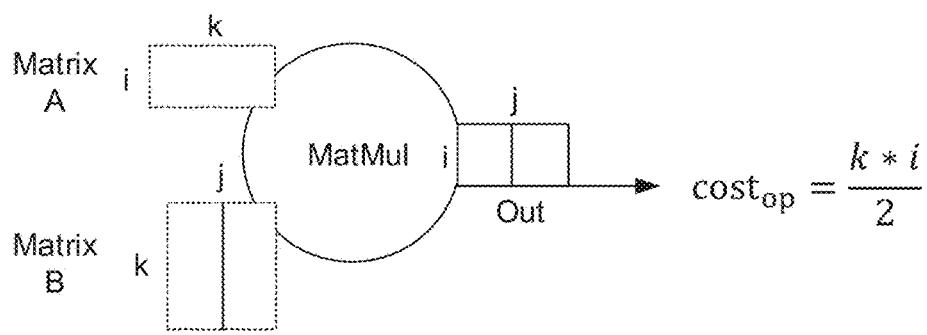
FIG. 12 illustrates an example of another partitioning configuration for matrix multiplication, according to an embodiment of the present disclosure.

FIG. 12 illustrates an example of another partitioning configuration for matrix multiplication, according to an embodiment. Matrices A and B are again provided as examples of input tensors. In a second partitioning configuration, matrix B may be partitioned with respect to axis j. For example, a left half of matrix B may be considered as a first subtensor and a right half of matrix B may be considered as a second subtensor. To calculate the partitioned matrix multiplication, the first computing device may need to have access to the left half of matrix B and entire matrix A. The second computing device needs to have access to the right half of matrix B and entire matrix A. Therefore, an intra-operator communication cost may be determined based on dimensions of matrix B, for example, based on $$\text{cost}_{op} = \frac{k * i}{2}.$$

The output tensor may comprise a left subtensor comprising and output matrix of the first computing device and a right subtensor comprising an output matrix of the second computing device.

Figure 13:
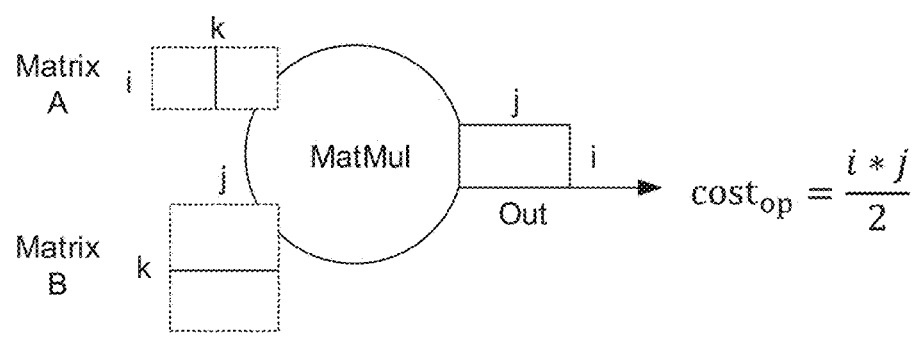
FIG. 13 illustrates an example of another partitioning configuration for matrix multiplication, according to an embodiment of the present disclosure.

FIG. 13 illustrates an example of another partitioning configuration for matrix multiplication, according to an embodiment. Matrices A and B are again provided as examples of input tensors. In a third partitioning configuration, matrices A and B may be partitioned with respect to axis k. For example, a left half of matrix A may be considered as a first subtensor and a right half of matrix A may be considered as a second subtensor. An upper half of matrix B may be considered as a third subtensor and a lower half of matrix B may be considered as a fourth subtensor. To calculate the partitioned matrix multiplication, the first computing device may need to have access only to the left half of matrix A and the upper half of matrix B. The second computing device may need to have access only to the right half of matrix A and the lower half of matrix B. However, the output matrices of the computing devices may need to be summed and redistributed to the computing devices. Therefore, an intra-operator communication cost may be determined based on dimensions of the output, for example, based on $$\text{cost}_{op} = \frac{i * j}{2}.$$

Figure 14:
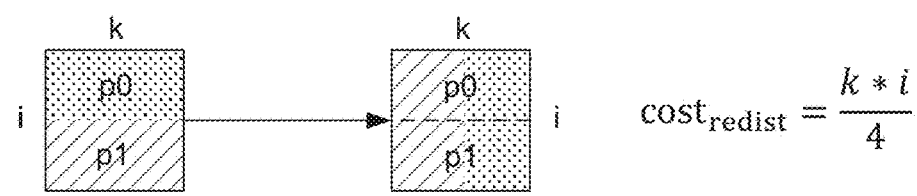
FIG. 14 illustrates an example of inter-operator cost for tensor rearrangement communication, according to an embodiment of the present disclosure.

FIG. 14 illustrates an example of determining an inter-operator cost for tensor rearrangement communication, according to an embodiment. The dotted and dashed portions may be associated with different computing devices. For example, if one node is configured to be partitioned according to axis i for one operator node and to be partitioned according to axis k for another operator node, then half of the dotted and dashed portions may need to be communicated between the computing devices, because the other half may be already available at the respective computing device. If network bandwidth is not saturated, the communication for the dotted and dashed device may be performed simultaneously. Hence, the inter-operator communication cost may be determined based on dimensions of the tensor which is needed at both computing devices, for example, by $$\text{cost}_{redist} = \frac{i * k}{4}.$$

Figure 15:
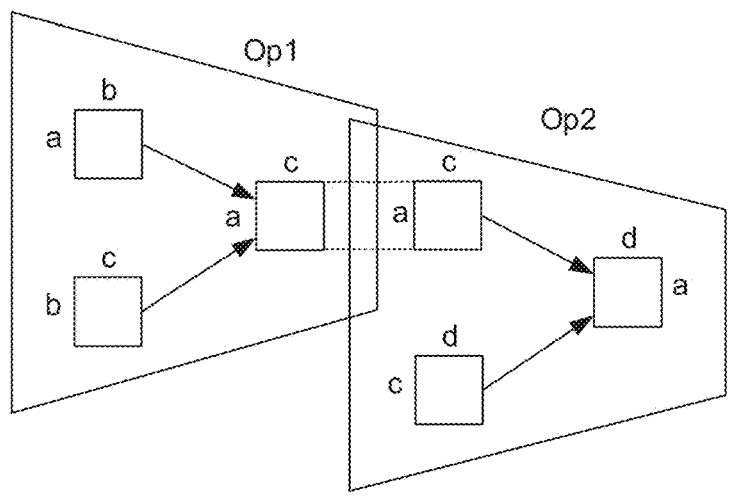
FIG. 15 illustrates an example of determining a processing order of subgraphs for matrix multiplication, according to an embodiment of the present disclosure.

FIGS. 15 to 19 illustrate an example of determining a partitioning scheme for computing a graph comprising two consecutive matrix multiplications on four devices in a distributed and parallel manner. Based on the number of parallel computing devices (4) the number of partitioning recursions, N, may be determined to be N=2, since $2^N=2^2=4$ FIG. 15 illustrates an example of determining a processing order of subgraphs for matrix multiplication, according to an embodiment. The intra-operator communication cost model described above may be used to determine a processing order for a first operator node (Op1) and a second operator node (Op2), both of which include matrix multiplications in this example. The dimensions of the matrices (a=30, b=10, c=20, d=40) may be used to determine the intra-operator communication cost for different candidate partitioning axes (i, j, k) as follows:

$$\text{cost}(i)_{Op1} = \frac{bc}{2} = 100 \quad \text{Operator node 1}$$

$$\text{cost}(j)_{Op1} = \frac{ab}{2} = 150$$

$$\text{cost}(k)_{Op1} = \frac{ac}{2} = 300$$

$$\text{cost}(i)_{Op2} = \frac{cd}{2} = 400 \quad \text{Operator node 2}$$

$$\text{cost}(j)_{Op2} = \frac{ac}{2} = 300$$

$$\text{cost}(k)_{Op2} = \frac{ad}{2} = 600.$$

The processing order may be determined based on comparing the lowest cost for each operator node and selecting the operator node associated with the highest value of the compared costs. In this example, the second operator node may be selected to be processed first, because cost(j)$_{Op2}$=300, which represents the lowest cost for the second operator node, is higher than cost(i)$_{Op1}$=100, which represents the lowest cost for the first operator node.

Figure 16:
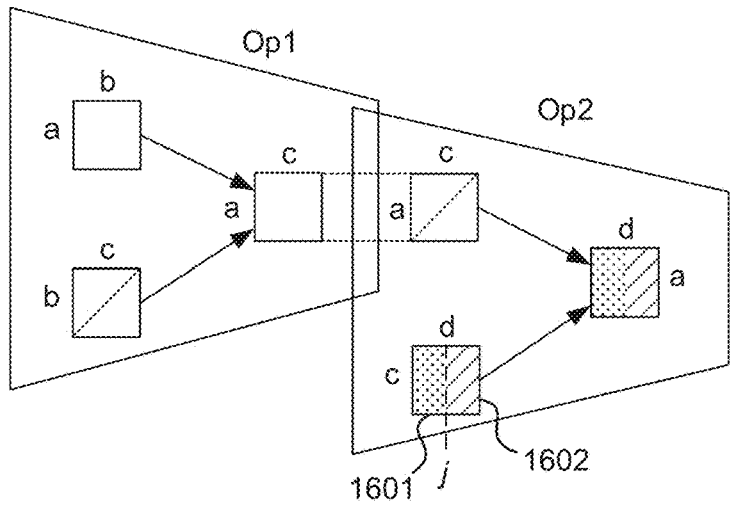
FIG. 16 illustrates an example of partitioning axes of tensors associated with a matrix multiplication, according to an embodiment of the present disclosure.

FIG. 16 illustrates an example of partitioning axes of tensors associated with a matrix multiplication, according to an embodiment. Based on the lowest intra-operator communication cost of the second operator node,cost(j)$_{Op2}$=300, the partitioning axis j may be selected for the second operator node. Therefore, the lower input matrix of the second operator node may be partitioned into a left portion 1601 and a right portion 1602. The output matrix of the second operator node may be partitioned in a similar manner.

Figure 17:
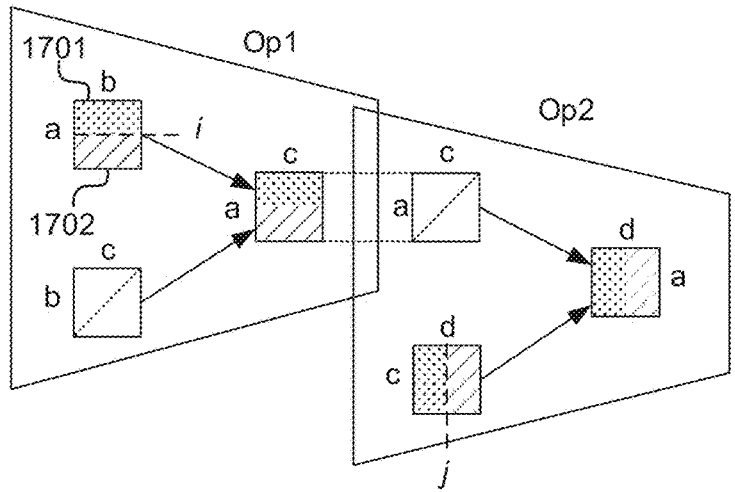
FIG. 17 illustrates an example of a partitioning axes of tensors associated with another matrix multiplication, according to an embodiment of the present disclosure.

FIG. 17 illustrates an example of partitioning axes of tensors associated with another matrix multiplication, according to an embodiment. Based on the lowest intra-operator communication cost for the first operator node, cost$(i)_{Op1}$=100, the partitioning axis i may be selected for the first operator node. In general, the partitioning axis may be selected based on the intra-operator communication cost and the inter-operator communication cost. However, in this example the tensor a×c shared between the two operator nodes is in an abstract state and therefore a selection may be made based on the intra-operator cost only. A tensor may be considered to be in an abstract state if the tensor is not associated with the selected partitioning axis. For example, for matrix multiplication A*B=C, there may be three shared axes i,j, and k, as described in connection with FIGS. 11 to 13. Considering partitioning axis i (FIG. 11), matrices A and C, which have axis i, may be partitioned into two portions in a definitive way. However, matrix B, which is not associated with axis i, may be later partitioned with either axis j or k with no different cost. Partitioning axis j or k may be determined later, for example, after the partitioning recursions, for example, based on minimizing the inter-operator communication cost. Similarly, in the example of FIG. 12 the selected axis is j and therefore matrix A is in the abstract state. In FIGS. 16 to 19 diagonal dashed lines indicate an abstract state of a tensor or subtensor. In the example of FIG. 17, matrix a×c of the second operator node is in abstract state, but matrix a×c of the first operator node is not in an abstract state.

The second operator node may be informed that the partitioning axis of its upper input tensor for the current recursion should be the same as the partitioning axis of the output tensor of the first operator node. This information may be provided, for example, after all partitioning recursions. Therefore, the upper input matrix of the first operator node may be partitioned into an upper portion 1701 and a lower portion 1702. The output matrix of the first operator node may be partitioned in a similar manner.

After selecting partitioning axes for the first and second operator nodes, the first partitioning recursion (inner loop) is completed. Since N=2, a second partitioning recursion may be initiated to further partition the subtensors obtained at the first partitioning recursion. To determine the processing order for the second partitioning recursion, the dimensions of the subtensors may be used to determine the intra-operator communication cost for different partitioning axes (i,j, k) as follows:

$$\text{cost}(i)_{Op1} = \frac{bc}{2} = 100 \quad \text{Operator node 1}$$

$$\text{cost}(j)_{Op1} = \frac{ab}{4} = 75$$

$$\text{cost}(k)_{Op1} = \frac{ac}{4} = 150$$

$$\text{cost}(i)_{Op2} = \frac{cd}{4} = 200 \quad \text{Operator node 2}$$

$$\text{cost}(j)_{Op2} = \frac{ac}{2} = 300$$

$$\text{cost}(k)_{Op2} = \frac{ad}{4} = 300.$$

Therefore, the processing order may be determined to be the same, that is, the second operator node may be processed first during the second partitioning recursion.

Figure 18:
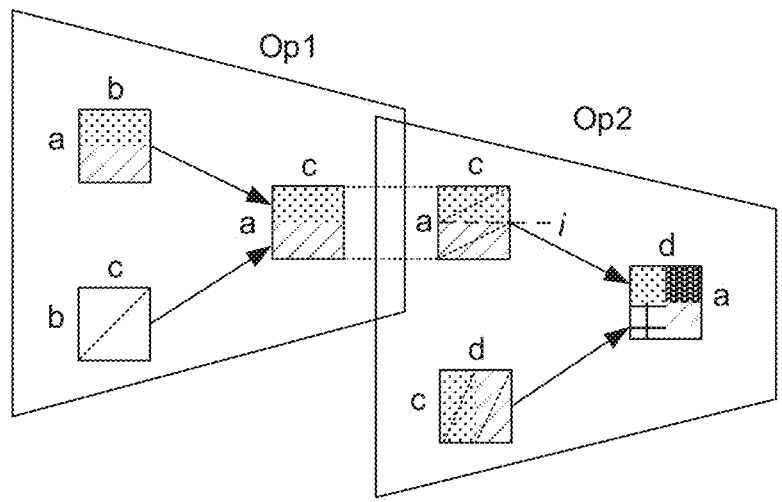
FIG. 18 illustrates an example of partitioning axes of subtensors associated with the matrix multiplication, according to an embodiment of the present disclosure.

FIG. 18 illustrates an example of partitioning axes of subtensors associated with the matrix multiplication, according to an embodiment. Based on the lowest intra-operator communication cost of the second operator node, cost$(i)_{Op2}$=200, the partitioning axis i may be selected for the second operator node at the second partitioning recursion.

Figure 19:
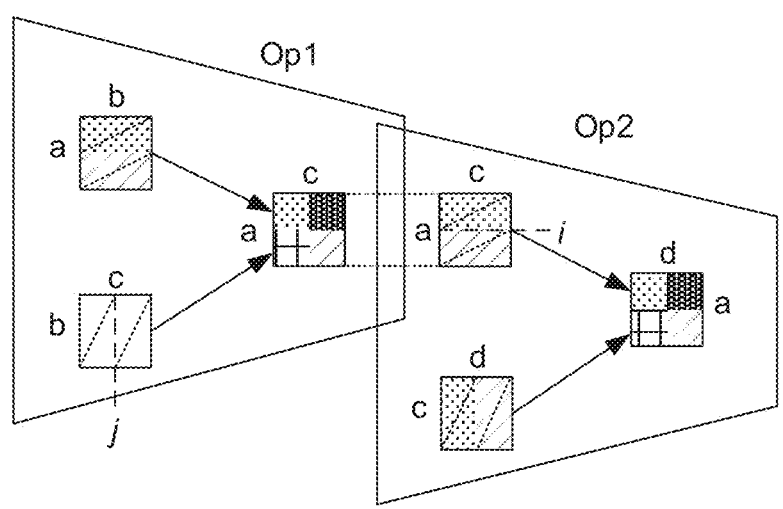
FIG. 19 illustrates an example of a partitioning axes of subtensors associated with the other matrix multiplication, according to an embodiment of the present disclosure.

FIG. 19 illustrates an example of partitioning axes of subtensors associated with the other matrix multiplication, according to an embodiment. Based on the lowest intra-operator communication cost for the first operator node, cost $(j)_{Op1}$=75, the partitioning axis j may be selected for the second operator node at the second partitioning recursion. Based on FIG. 18, the tensor a×c in the second operator node is associated with two partitions, one with axis i and one abstract, and so far the first operator node is associated with one partition with axis i, same as in the second operator node. So, the abstract state is still applicable, and therefore the intra-operator communication cost may be used without inter-operator communication cost.

After selecting the partitioning axes for both operator nodes, the number of completed partitioning recursions is two and therefore no further partitioning recursions are to be performed at the outer loop. If devices can communicate with each other simultaneously and network bandwidth is not saturated, a total communication cost may be determined, for example, based on the intra-operator communication costs of the operator nodes and the inter-operator communication cost between the operator nodes, for example, by $$\text{cost}_{total} = \text{cost}_{Op1} + \text{cost}_{redist} + \text{cost}_{Op2} = \left(\frac{ab}{4} + \frac{bc}{4}\right) + 0 + \left(\frac{cd}{4} + \frac{ac}{4}\right) = 475.$$

If the devices communicate one by one, the total communication cost may be $$\text{cost}_{total} = \text{cost}_{Op1} + \text{cost}_{redist} + \text{cost}_{Op2} = \left(\frac{ab}{2} + \frac{bc}{2}\right) + 0 + \left(\frac{cd}{2} + \frac{ac}{2}\right) = 950.$$

The final parallel computation scheme, comprising the determined partitioning axes, may be then output.

An example of applying the memory cost model for determining the number of partitioning recursions is provided below with reference to FIGS. 15 to 19. In this example, it is assumed that each parallel computing device is able to accommodate 1000 elements, which may be considered as a memory requirement. In FIG. 15, the memory needed for the first operator node is ab+bc+ac=1100 elements and the memory needed for the second operator node is ac+cd+ad=2600 elements. Since the memory requirement for each parallel computing device is 1000 elements, the partitions do not fit in the parallel computing devices and therefore a further partitioning recursion (e.g. outer loop of FIG. 10) may be performed to partition the computation to more devices.

In FIG. 16, the memory needed for the first operator node is still 1100 elements. The memory needed for the second operator node is ac+cd/2+ad/2=1600, which still exceeds the memory requirement of 1000 elements. In FIG. 17, the memory needed for the first operator node is ab/2+bc+ac/2=650 elements, which is lower than the memory requirement. However, the memory needed for the second operator node is still 1600. Hence, the first operator node would meet the memory requirement, but the second operator node would still not comply with the memory requirement. Therefore, the device may determine to perform further partitioning. In FIG. 18, the memory needed for the second operator node is $ac/2+cd/2+ad/4=1000$, which complies with the memory requirement. The operations of FIG. 19 may be used to balance the partitioning for both operator nodes. Even though the same memory requirement of 1000 elements is used in this example, it is understood that parallel computing devices may be associated with different memory requirements.

Figure 20:
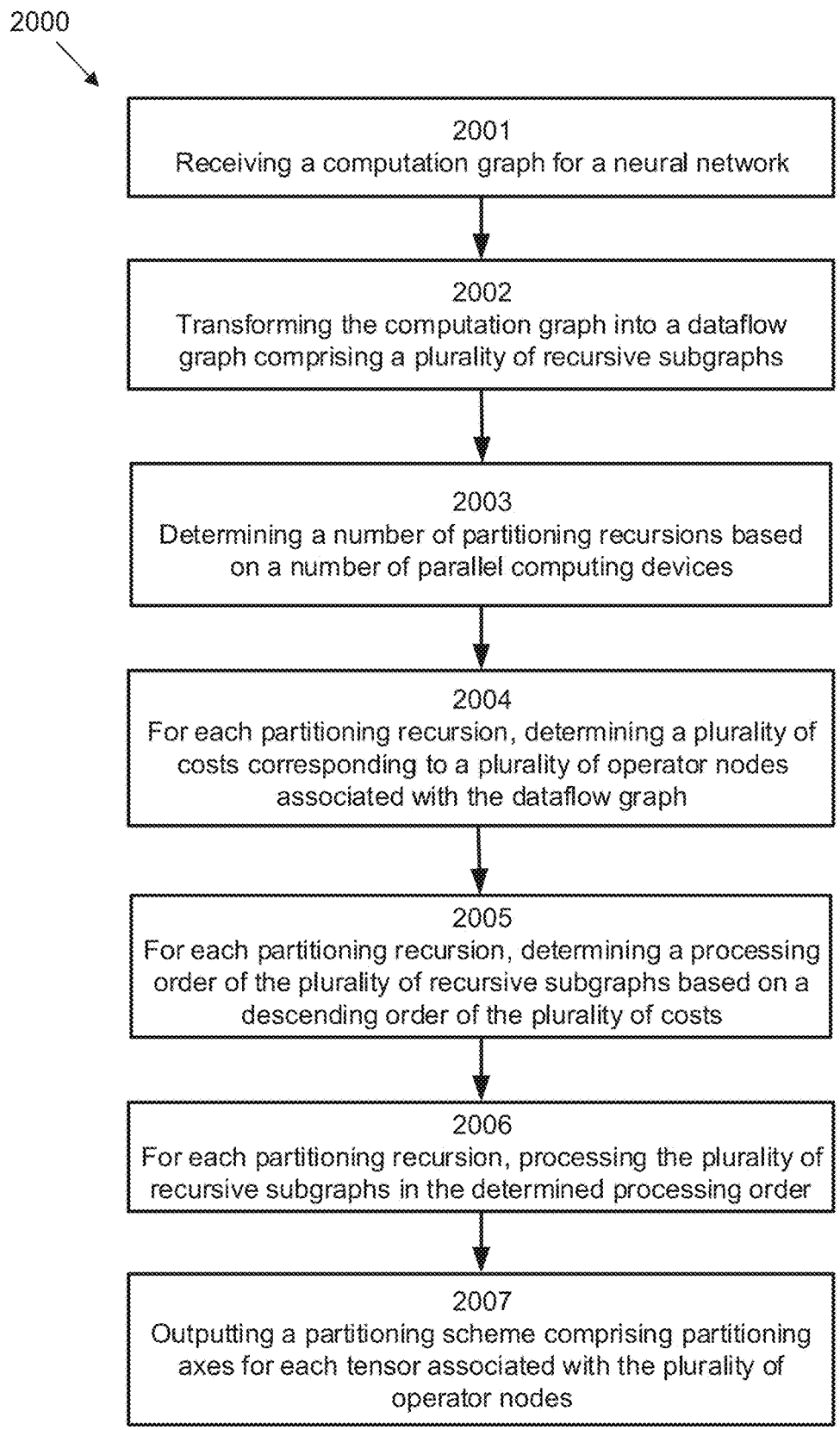
FIG. 20 illustrates an example of a method for determining a parallel computation scheme for a neural network, according to an embodiment of the present disclosure.

FIG. 20 illustrates an example of a method 2000 for determining a parallel computation scheme for a neural network, according to an embodiment.

At 2001, the method may comprise receiving a computation graph for a neural network.

At 2002, the method may comprise transforming the computation graph into a dataflow graph comprising a plurality of recursive subgraphs. According to an example, each recursive subgraph may comprise a tuple of another recursive subgraph and an operator node or an empty graph.

At 2003, the method may comprise determining a number of partitioning recursions based on a number of parallel computing devices.

At 2004, the method may comprise, for each partitioning recursion, determining a plurality of costs corresponding to a plurality of operator nodes associated with the dataflow graph.

At 2005, the method may comprise, for each partitioning recursion, determining a processing order of the plurality of recursive subgraphs based on a descending order of the plurality of costs.

At 2006, the method may comprise, for each partitioning recursion, processing the plurality of recursive subgraphs in the determined processing order. According to an example, processing a recursive subgraph may comprise selecting a partitioning axis for tensors associated with an operator node of the recursive subgraph.

At 2007, the method may comprise outputting a partitioning scheme comprising partitioning axes for each tensor associated with the plurality of operator nodes.

Further features of the method directly result from the functionalities and parameters of the methods and devices, as described in throughout the specification, and are therefore not repeated here.

Example embodiments provide an efficient and deterministic method for determining a parallel computing scheme for a neural network. For example, with a reference architecture ResNet50, a significant reduction of time consumed for determining a parallel computing scheme may be achieved. For example, a speed-up of 72× (72 times) may be achieved already with 64 parallel computing devices, when compared to reference solutions. When the number of parallel computing devices increases, the scheme may be even more beneficial. For example, a 220× speed-up may be achieved with 512 parallel computing devices. Therefore, the parallel efficiency of determining a parallel computing scheme for a neural network may be significantly improved.

A device or a system may be configured to perform or cause performance of any aspect of the method(s) described herein. Further, a computer program may comprise program code configured to cause performance of an aspect of the method(s) described herein, then the computer program is executed on a computer. Further, the computer program product may comprise a computer readable storage medium storing program code thereon, the program code comprising instruction for performing any aspect of the method(s) described herein. Further, a device may comprise means for performing any aspect of the method(s) described herein. According to an example embodiment, the means comprises at least one processor, and memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items. Furthermore, references to 'at least one' item or 'one or more' items may refer to one or a plurality of those items.

The steps or operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or device may contain additional blocks or elements.

Although subjects may be referred to as 'first' or 'second' subjects, this does not necessarily indicate any order or importance of the subjects. Instead, such attributes may be used solely for the purpose of making a difference between subjects.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

What is claimed is:

1. A device for determining a parallel computation scheme for a neural network, the device comprising at least one processor configured to:
  receive a computation graph for the neural network;
  transform the computation graph into a recursive dataflow graph comprising a plurality of recursive subgraphs, wherein each of the recursive subgraphs is respectively a tuple of another of the recursive subgraphs and an operator node;

determine a number of partitioning recursions based on a number of parallel computing devices;

for each of the partitioning recursions:

determine a plurality of costs corresponding to a plurality of operator nodes associated with the recursive dataflow graph, determine a processing order of the plurality of recursive subgraphs based on a descending order of the plurality of costs, process the plurality of recursive subgraphs in the determined processing order, wherein processing a recursive subgraph, of the plurality of recursive subgraphs, comprises selecting a partitioning axis for tensors associated with an operator node of the recursive subgraph;

output a partitioning scheme comprising partitioning axes for each of the tensors associated with the plurality of operator nodes; and wherein to select the partitioning axis for the tensors associated with the operator node based on an inter-operator communication cost comprising an amount of data to be communicated between the parallel computing devices for executing a neighboring operator node based on a shared tensor between the operator node and the neighboring operator node or for executing the operator node based on an output of the neighboring operator node.

2. The device according to claim 1, wherein the at least one processor is further configured to:

determine the number of partitioning recursions such that $2^N$ is equal to the number of parallel computing devices, wherein N is the number of partitioning recursions.

3. The device according to claim 1, wherein the at least one processor is further configured to:

determine the plurality of costs corresponding to the plurality of operator nodes based on an amount of data to be communicated between the parallel computing devices for each operator node.

4. The device according to claim 1, wherein the device at least one processor is further configured to:

select the partitioning axis for the tensors associated with the operator node based on an intra-operator communication cost comprising an amount of data to be communicated between the parallel computing devices for the operator node.

5. The device according to claim 4, wherein the at least one processor is further configured to:

select the partitioning axis for the tensors associated with the operator node based on the intra-operator communication cost, and based on determining that no partitioning axis has been determined for a neighboring operator node at a current partitioning recursion.

6. The device according to claim 1, wherein at least one processor is further configured to:

select the partitioning axis for the tensors associated with the operator node based on an intra-operator communication cost comprising an amount of data to be communicated between the parallel computing devices for the operator node; and select the partitioning axis for the tensors associated with the operator node based on the intra-operator communication cost and the inter-operator communication cost, and based on determining that at least one partitioning axis has been determined for the neighboring operator node or another neighboring operator node at the current partitioning recursion.

7. The device according to claim 1, wherein the at least one processor is further configured to:

determine whether the partitioning scheme complies with at least one memory requirement associated with the parallel computing devices; and output the partitioning scheme based on determining that the partitioning scheme complies with the at least one memory requirement associated with the parallel computing devices.

8. A method for determining a parallel computation scheme for a neural network, the method comprising: receiving a computation graph for the neural network;

transforming the computation graph into a recursive dataflow graph comprising a plurality of recursive subgraphs, wherein each of the recursive subgraphs respectively is a tuple of another one of recursive subgraphs and an operator node;

determining a number of partitioning recursions based on a number of parallel computing devices; for each of the partitioning recursions:

determining a plurality of costs corresponding to a plurality of operator nodes associated with the recursive dataflow graph, determining a processing order of the plurality of recursive subgraphs based on a descending order of the plurality of costs, and processing the plurality of recursive subgraphs in the determined processing order, wherein processing a recursive subgraph, of the recursive subgraphs, comprises selecting a partitioning axis for tensors associated with an operator node of the recursive subgraph;

outputting a partitioning scheme comprising partitioning axes for each of the tensors associated with the plurality of operator nodes; and selecting the partitioning axis for the tensors associated with the operator node based on an inter-operator communication cost comprising an amount of data to be communicated between the parallel computing devices for executing a neighboring operator node based on a shared tensor between the operator node and the neighboring operator node or for executing the operator node based on an output of the neighboring operator node.

9. The method according to claim 8, the method further comprising:

determining the number of partitioning recursions such that $2^N$ is equal to the number of parallel computing devices, wherein N is the number of partitioning recursions.

10. The method according to claim 8, the method further comprising:

determining the plurality of costs corresponding to the plurality of operator nodes based on an amount of data to be communicated between the parallel computing devices for each operator node.

11. The method according to claim 8, the method further comprising:

selecting the partitioning axis for the tensors associated with the operator node based on an intra-operator communication cost comprising an amount of data to be communicated between the parallel computing devices for the operator node.

12. The method according to claim 11, the method further comprising:

selecting the partitioning axis for the tensors associated with the operator node based on the intra-operator communication cost, and based on determining that no partitioning axis has been determined for a neighboring operator node at a current partitioning recursion.

13. The method according to claim 8, the method further comprising:

selecting the partitioning axis for the tensors associated with the operator node based on the intra-operator communication cost, and based on determining that no partitioning axis has been determined for a neighboring operator node at a current partitioning recursion, and selecting the partitioning axis for the tensors associated with the operator node based on the intra-operator communication cost and the inter-operator communication cost, and based on determining that at least one partitioning axis has been determined for the neighboring operator node or another neighboring operator node at a current partitioning recursion.

14. The method according to claim 8, the method further comprising:

determining whether the partitioning scheme complies with at least one memory requirement associated with the parallel computing devices; and outputting the partitioning scheme based on determining that the partitioning scheme complies with the at least one memory requirement associated with parallel computing devices the device.

15. A non-transitory computer readable medium comprising a computer program comprising a program code configured to cause performance of the method according to claim 8, upon the computer program being executed on a computer.

* * * * *